D. W. WRIGHT.
APPARATUS FOR FEEDING LIVE STOCK.
APPLICATION FILED JULY 31, 1908.
933,940.
Patented Sept. 14, 1909.
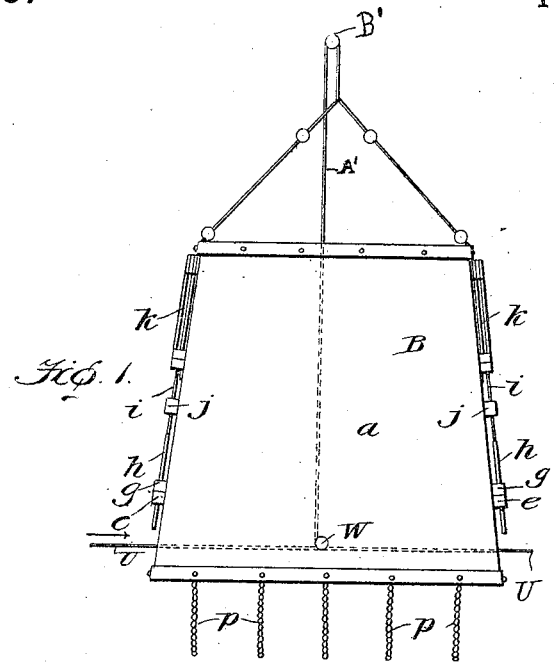
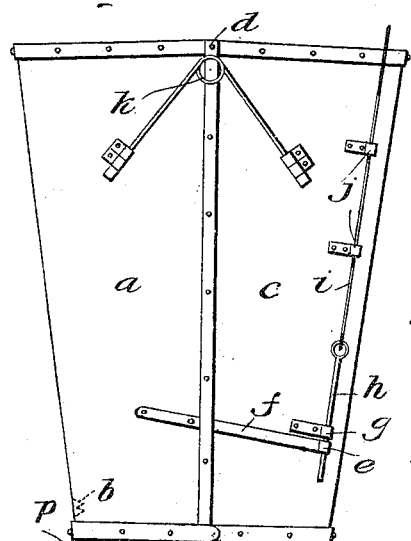
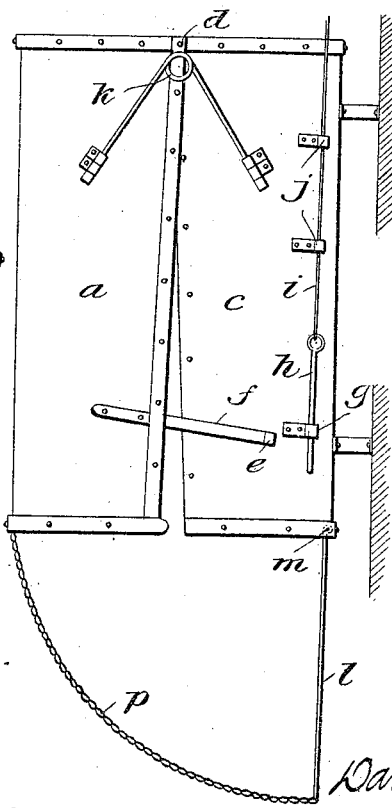
Inventor
David W. Wright
By James Sheehy
Attorney
Witnesses
J. J. Sheehy Jr.

UNITED STATES PATENT OFFICE.

DAVID W. WRIGHT, OF NEW ORLEANS, LOUISIANA.

APPARATUS FOR FEEDING LIVE STOCK.

933,940.

Specification of Letters Patent. Patented Sept. 14, 1909.

Application filed July 31, 1908. Serial No. 446,327.

*To all whom it may concern:*

Be it known that I, DAVID W. WRIGHT, citizen of the United States, residing at New Orleans, in the parish of Orleans and State of Louisiana, have invented new and useful Improvements in Apparatus for Feeding Live Stock, of which the following is a specification.

My invention relates to apparatus for feeding live stock; and it contemplates the provision of an apparatus for conveniently feeding hay and the like to animals.

With the foregoing in mind the invention will be fully understood from the following description and claims, when the same are read in connection with the drawings, accompanying and forming part of this specification, in which:

Figure 1 is a general view of so much of a stock feeding apparatus as is necessary to illustrate the best practical embodiment of my invention of which I am aware. Figs. 2 and 3 are detail views of the hay receptacle which forms an important part of the apparatus.

Similar letters designate corresponding parts in all of the views of the drawings, referring to which:

B is a hay receptacle constructed in accordance with my invention. As shown in Figs. 1, 2 and 3, the hay receptacle B comprises a section $a$ having in its lower portion two (more or less) rests $b$, a section $c$ hinged at $d$ to the section $a$, eyes $e$ arranged at opposite sides of the section $c$ and fixedly connected through comparatively long straps $f$ with opposite sides of the section $a$, eyes $g$ fixed to opposite sides of section $c$ and adapted when the receptacle is closed to register with the eyes $e$, bolts $h$ adapted to rest in the registered eyes $e$ and $g$ and hold the lower portions of the sections together, cables $i$ connected to the bolts $h$ and extending through guides $j$ on the section $c$, springs $k$, disposed at opposite sides of the sections $a$ and $c$ and having coils and also having arms connected to the sections $a$ and $c$, whereby when the bolts $h$ are raised, said springs are adapted to separate the lower ends of the sections after the manner shown in Fig. 3, an imperforate bottom $l$, hinged at $m$ to the section $c$ and adapted when the receptacle is closed to bear at its free edge on the rests $b$, and a plurality of cables, preferably chains, $p$, connected at one end to the section $a$ and at their opposite ends to the free edge of the bottom $l$.

It will be understood from the foregoing that when the parts of the receptacle B are in the positions shown in Figs. 1 and 2, and hay is placed in the said receptacle, the hay will be supported by the bottom $l$ in the receptacle and the animal below the receptacle will be prevented from reaching and eating the hay. When, however, the bolts $h$ are raised by upward pull on the cables $i$, the lower ends of the sections $a$ and $c$ will swing apart, and the bottom $l$ will gravitate to the pendent position shown in Fig. 3, whereupon the cables or chains $p$ will assume the positions shown in Fig. 3, and by so doing will form an improvised rack which will serve to support the mass of hay in such manner that the animal below the receptacle is enabled to conveniently reach and eat the hay.

It will be manifest from the foregoing that when it is desired to charge the receptacle B with hay, the attendant has but to raise the bottom $l$ and close the lower ends of the sections $a$ and $c$ together so that the rests $b$ assume positions below the free edge of the bottom $l$, and then replace the bolts $h$ in the registered eyes $e$ and $g$, since when this is done the receptacle is adapted to hold hay without liability of accidental precipitation of the same. It will also be noted in this connection that upon raising of the bottom $l$ the chains or cables $p$ will assume the pendent positions shown in Figs. 1 and 2, and consequently upon release of the bottom $l$ the said chains by gravitating will assist the fall of the bottom and the separation of the lower ends of the sections $a$ and $c$. I prefer, however, to employ the springs $k$ for separating the lower ends of the sections $a$ and $c$ inasmuch as said springs are positive in their action and contribute to the reliability of the receptacle as a whole.

U is a cable through the medium of which the bolts $h$ may be raised for the purpose before described when the left-hand end of the cable is released by means (not shown) that may be employed to normally hold it against movement. The cable U extends under a sheave W and is connected with a cable A' which is passed around the sheave W and over a sheave B' and is connected, in turn, with the before described cables $i$. Thus it will be manifest that when the cable U is pulled toward the right, the bolts $h$ of the receptacle B will be drawn, with the result that hay previously placed in the receptacle B will be supplied to the animal to be fed.

While I have shown but one receptacle B it is obvious that a number of receptacles similar to B may be connected with the cable U in the manner described so that a number of animals may be synchronously supplied with hay.

In addition to the practical advantages hereinbefore ascribed to my novel apparatus, it will be noted that the apparatus embodies no delicate parts and is therefore well adapted to withstand the rough usage to which apparatus of corresponding character is ordinarily subjected.

As before stated the construction herein illustrated and described constitutes the best practical embodiment of my invention of which I am cognizant, but it is obvious that in the future practice of the invention such changes or modifications may be made as fairly fall within the scope of my invention as defined in the claims appended.

Having described my invention, what I claim and desire to secure by Letters-Patent, is:

1. In an apparatus for the purpose described, a hay receptacle having gravitating means adapted, when raised, to form the bottom of the receptacle, and other gravitating means adapted, when the first named means falls, to form therewith a hay rack.

2. In an apparatus for the purpose described, a hay receptacle adapted to be enlarged at its lower end and having gravitating means adapted, when raised, to form the bottom of the receptacle and also adapted to be released by the enlargement of the receptacle, and other gravitating means adapted, when the first named means falls, to form therewith a hay rack.

3. In an apparatus for the purpose described, a hay receptacle having a drop bottom and also having means connected and movable with said bottom, for forming therewith a hay rack.

4. In an apparatus for the purpose described, a hay receptacle adapted to be enlarged at its lower end and having a drop bottom adapted to be released by said enlargement and also having means connected and movable with said bottom for forming therewith a hay rack.

5. In an apparatus for the purpose set forth, a hay receptacle having a drop bottom and also having cables, adapted when the bottom falls, to form therewith a hay rack.

6. In an apparatus for the purpose set forth, a hay receptacle adapted to be enlarged at its lower end and having a drop bottom and also having cables, adapted when the bottom falls to form therewith a hay rack.

7. In an apparatus for the purpose set forth, a hay receptacle comprising sections the lower portions of which are separable, means for normally holding the lower portions of the receptacle together, a gravitating bottom hinged to one section and adapted to be held against falling by the other section when said section is in its normal position, and cables connected with said section and the bottom and adapted on gravitation of the latter to form a hay rack.

8. In an apparatus for the purpose set forth, a hay receptacle comprising sections hinged together at their upper ends and separable at their lower ends, means for normally holding the lower portions of the receptacle together, means for separating the lower portions of the sections when the same are disconnected, a gravitating bottom hinged to one section and adapted to be held against falling by the other section when said section is in its normal position, and cables connected with said section and the bottom and adapted on gravitation of the latter to form a hay rack.

9. In an apparatus for the purpose set forth, a hay receptacle comprising sections the lower portions of which are separable, means for normally holding the lower portions of the receptacle together, means for separating said portions when the same are disconnected, a gravitating bottom hinged to one section and adapted to be held against falling by the other section when said section is in its normal position, and means connected with said section and the bottom and adapted on gravitation of the latter to form a hay rack.

10. In an apparatus for the purpose set forth, a hay receptacle comprising sections hinged together at their upper ends and separable at their lower ends and having eyes adapted to be registered, means adapted to coöperate with said eyes for normally holding the lower portions of the receptacle together, a spring adapted on withdrawal of said means to separate the lower portions of the sections, a gravitating bottom hinged to one section and adapted to be held against falling by the other section when said section is in its normal position, and cables connected with said section and the bottom and adapted on gravitation of the latter to form a hay rack.

In testimony whereof I have hereunto set my hand in presence of two subscribing witnesses.

DAVID W. WRIGHT.

Witnesses:
A. PANULLE,
L. P. BRYANT, Jr.